(12) United States Patent
Lee

(10) Patent No.: US 11,358,333 B2
(45) Date of Patent: Jun. 14, 2022

(54) FOLDABLE 3D PRINTER

(71) Applicant: Anatz Inc., Seoul (KR)

(72) Inventor: Dongyub Lee, Seoul (KR)

(73) Assignee: Anatz Inc., Seoul (KR)

( * ) Notice: Subject to any disclaimer, the term of this patent is extended or adjusted under 35 U.S.C. 154(b) by 24 days.

(21) Appl. No.: 17/140,154

(22) Filed: Jan. 4, 2021

(65) Prior Publication Data

US 2021/0206074 A1    Jul. 8, 2021

Related U.S. Application Data

(60) Provisional application No. 62/956,664, filed on Jan. 3, 2020.

(51) Int. Cl.
| | |
|---|---|
| *B29C 64/25* | (2017.01) |
| *B29C 64/209* | (2017.01) |
| *B33Y 30/00* | (2015.01) |
| *B29C 64/236* | (2017.01) |
| *B29C 64/245* | (2017.01) |
| *B29C 64/232* | (2017.01) |
| *B29C 64/118* | (2017.01) |

(52) U.S. Cl.
CPC ............ *B29C 64/25* (2017.08); *B29C 64/118* (2017.08); *B29C 64/209* (2017.08); *B29C 64/232* (2017.08); *B29C 64/236* (2017.08); *B29C 64/245* (2017.08); *B33Y 30/00* (2014.12)

(58) Field of Classification Search
CPC ... B29C 64/118; B29C 64/209; B29C 64/232; B29C 64/236; B29C 64/245; B29C 64/25
See application file for complete search history.

(56) References Cited

U.S. PATENT DOCUMENTS

| | | | | |
|---|---|---|---|---|
| 3,687,408 | A | * | 8/1972 | Lake ................... B65B 67/1205 248/97 |
| 4,927,104 | A | * | 5/1990 | Miller ................. B65B 67/1205 D34/5 |
| 2007/0035655 | A1 | * | 2/2007 | Chen ....................... H04N 1/04 348/373 |
| 2017/0036399 | A1 | * | 2/2017 | Cheung ................... B29C 35/16 |
| 2017/0173890 | A1 | * | 6/2017 | Choi ..................... B29C 64/245 |

FOREIGN PATENT DOCUMENTS

| | | | |
|---|---|---|---|
| CN | 110815813 | * | 2/2020 |
| KR | 10-2018-0055152 A | | 5/2018 |

* cited by examiner

*Primary Examiner* — Joseph S Del Sole
*Assistant Examiner* — Manley L Cummins, IV
(74) *Attorney, Agent, or Firm* — Revolution IP, PLLC

(57) ABSTRACT

A foldable 3D printer includes: a main body having an upper surface parallel to the ground; a stage coupled to the upper surface of the main body and adapted to stack a molding material thereon; a nozzle unit spraying the molding material onto the stage; and a bridge assembly adapted to mount the nozzle unit thereon, the bridge assembly being rotatably coupled to the main body to be positioned parallel to the main body when not in use and to be positioned perpendicular to the main body when in use.

11 Claims, 9 Drawing Sheets

630

FOLDABLE 3D PRINTER

FIELD

The present invention relates to a foldable 3D printer. More particularly, the present invention relates to a foldable 3D printer which has high portability with a configuration in which a bridge assembly transferring a nozzle in the Y-axis and Z-axis directions can be rotated to a position folded parallel to a stage so as to reduce the volume of the 3D printer when the 3D printer is not in use.

BACKGROUND

Unlike 2D printing such as blueprinting and graphic printing, 3D printing is a technology of implementing and copying a 3D shape, and has caused a lot of changes in the entire manufacturing process from planning to production due to capability thereof to reproduce the shape of a product in a few hours.

As an improvement of existing 2D printing techniques, 3D printing creates an actual shape through stepwise stacking of printouts and is actually used in the medical industry, such as dental modeling and pre-surgical simulation, and in the construction industry, such as creation of miniature buildings and real-time architecture design.

In addition, 3D printing technology can allow design based on reverse engineering (a process of extracting basic design information based on deep analysis of a finished product) and reduction in design error by copying an already created article or by making a shape created by computer aided design (CAD) into a real object.

As described above, 3D printing allows anyone with a digital design drawing and a 3D printer, anywhere in the world, to produce desired products, and thus is regarded as the core of a paradigm shift in the manufacturing industry through drastic simplification of a manufacturing process.

A material extrusion printer, which is a 3D printer, employs a method of solidifying a molding material, such as an ABS or PLA resin, on a stage while heating and melting the molding material, and is mainly put into use in schools or personal use.

However, typical 3D printers are generally bulky and thus are not easy to carry, store, and move.

RELATED LITERATURE

Patent Document (Patent Document 0001) Korean Patent Laid-open Publication No. 10-2018-0055152 (titled "Foldable 3D printer", published on May 25, 2018)

SUMMARY

Embodiments of the present invention have been conceived to solve such a problem in the art and provide a foldable 3D printer which has high portability with a configuration in which a bridge assembly transferring a nozzle in the Y-axis and Z-axis directions can be rotated to a position folded parallel to a stage so as to reduce the volume of the 3D printer when the 3D printer is not in use.

In accordance with an aspect of the present invention, a foldable 3D printer includes: a main body having an upper surface parallel to the ground; a stage coupled to the upper surface of the main body and adapted to stack a molding material thereon; a nozzle unit spraying the molding material onto the stage; and a bridge assembly adapted to mount the nozzle unit thereon, the bridge assembly being rotatably coupled to the main body to be positioned parallel to the main body when not in use and to be positioned perpendicular to the main body when in use.

The bridge assembly may have a U-shape to be coupled at opposite ends thereof to the main body and may be placed in the same plane as the main body when not in use.

The bridge assembly may include: a bridge having a U-shape to be coupled at opposite ends thereof to the main body; and a nozzle transfer bar coupled to the bridge to guide movement of the nozzle unit in the Y-axis direction.

The bridge may include a nozzle transfer bar guide guiding movement of the nozzle transfer bar in the Z-axis direction.

The bridge may include a pair of swing bars and a support bar connected to respective ends of the swing bars to form a U-shape, the pair of swing bars each being coupled at the other end thereof to a side surface of the main body to be rotated with respect to the main body; the nozzle transfer bar guide may be formed on each of the swing bars in a longitudinal direction of the swing bar; and the nozzle transfer bar may be coupled at opposite ends thereof to the nozzle transfer bar guide to be movable in the Z-axis direction.

The foldable 3D printer may further include: an extruder unit coupled to one surface of the bridge assembly to supply the molding material to the nozzle unit, the extruder unit being detachably coupled to the bridge assembly.

The extruder unit may include: an extruder supplying the molding material to the nozzle unit; an extruder motor coupled to the extruder to drive the extruder such that the extruder pushes the molding material to the nozzle unit; and an extruder bracket having an L-shape to be interposed at at least part thereof between the extruder and the extruder motor and to be fitted at the other portion thereof to the bridge assembly.

The bridge assembly may include a bridge having a U-shape to be coupled at opposite ends thereof to the main body and including a pair of swing bars and a support bar connected to respective ends of the swing bars to form a U-shape, the support bar having a bracket coupling protrusion formed at both ends thereof to fit the extruder bracket thereto, the bracket coupling protrusion including a first protrusion and a second protrusion; and the extruder bracket may include: an intervening portion interposed between the extruder and the extruder motor; and a fitting engagement portion protruding from one surface of the intervening portion in a perpendicular direction with respect to the intervening portion, the fitting engagement portion having a first fitting groove fitted to the first protrusion and a second fitting groove fitted to the second protrusion.

The main body may include: a housing to which the bridge assembly is coupled; a stage transfer guide embedded in the housing in a longitudinal direction of the housing to transfer the stage in the X-axis direction; and a stage support coupled to the stage transfer guide to be transferred in the X-axis direction and having an upper surface coupled to the stage.

The stage may include: a platform having a platform magnet attached thereto; and a stacking portion detachably coupled to the platform by magnetic force of the platform magnet, wherein the platform may be formed with an attachment/detachment hole to facilitate attachment/detachment of the stacking portion.

The foldable 3D printer may further include: a nozzle transfer belt coupled to the nozzle unit to transfer the nozzle unit; multiple belt rotating rollers coupled to one surface of the bridge assembly to transmit power to the nozzle transfer belt to rotate the nozzle transfer belt; and multiple roller motors coupled to the other surface of the bridge assembly to drive the respective belt rotating rollers.

The foldable 3D printer according to the present invention provides the following effects:

First, since the bridge assembly transferring the nozzle in the Y-axis and Z-axis directions can be rotated to a position folded parallel to the stage, the foldable 3D printer is easy to carry, store, and move.

Second, since the extruder bracket is coupled to the bridge assembly by fitting engagement, the extruder unit can be easily attached to/detached from the bridge assembly without a separate coupling member.

Third, the stacking portion of the stage is detachably coupled to the platform by magnetic force without a separate coupling member and the platform is formed with the attachment/detachment hole to facilitate attachment/detachment of the stacking portion to/from the platform.

DRAWINGS

DETAILED DESCRIPTION

Figure 1:
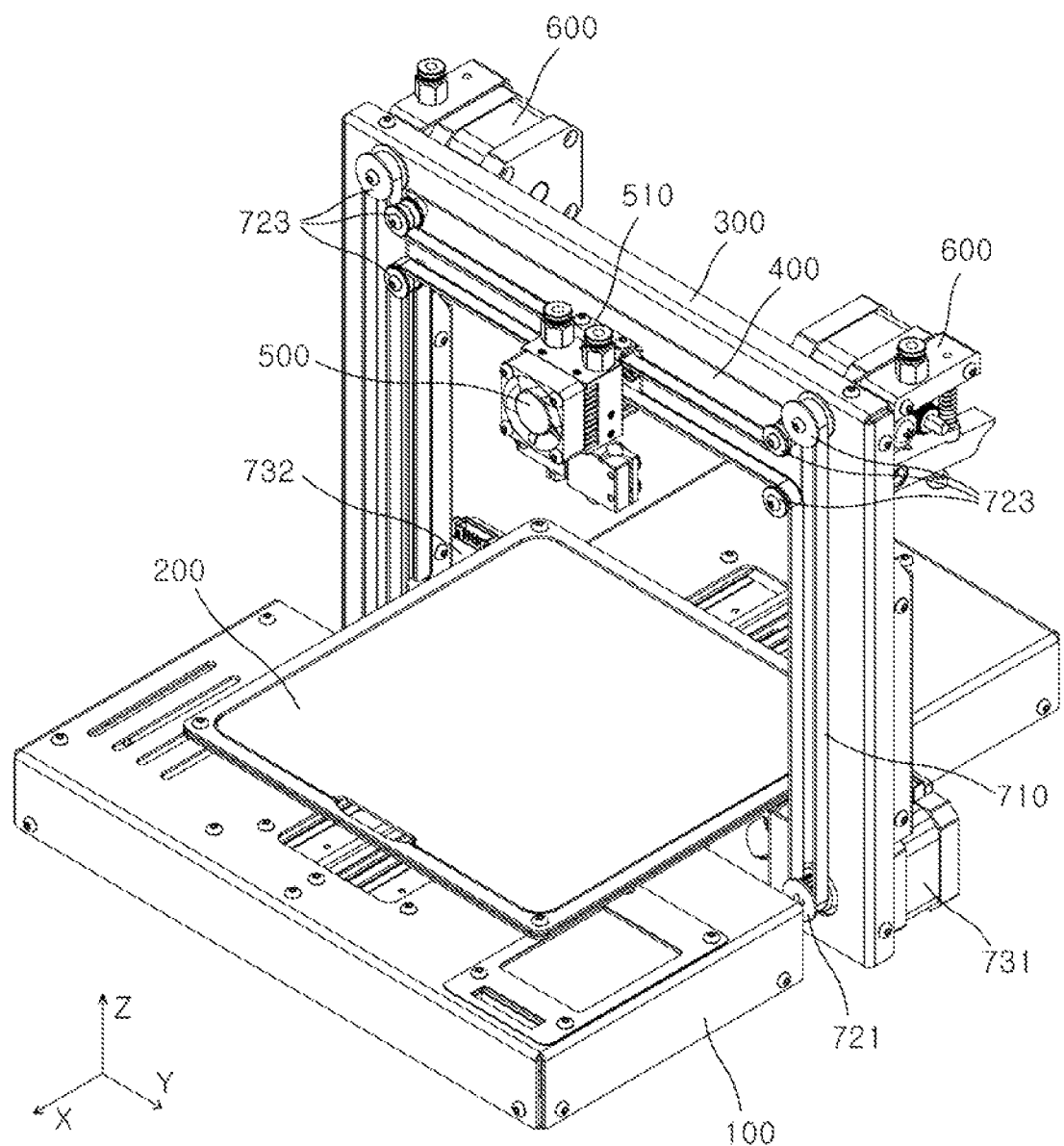
FIG. 1 to FIG. 3 are views showing the overall configuration of a foldable 3D printer according to the present invention.

Hereinafter, embodiments of the present invention will be described with reference to the accompanying drawings. It should be noted that like components will be denoted by like reference numerals throughout the specification and the accompanying drawings. In addition, repeated description of like components will be omitted for clarity. In addition, description of details apparent to those skilled in the art will be omitted for clarity.

Figure 8:
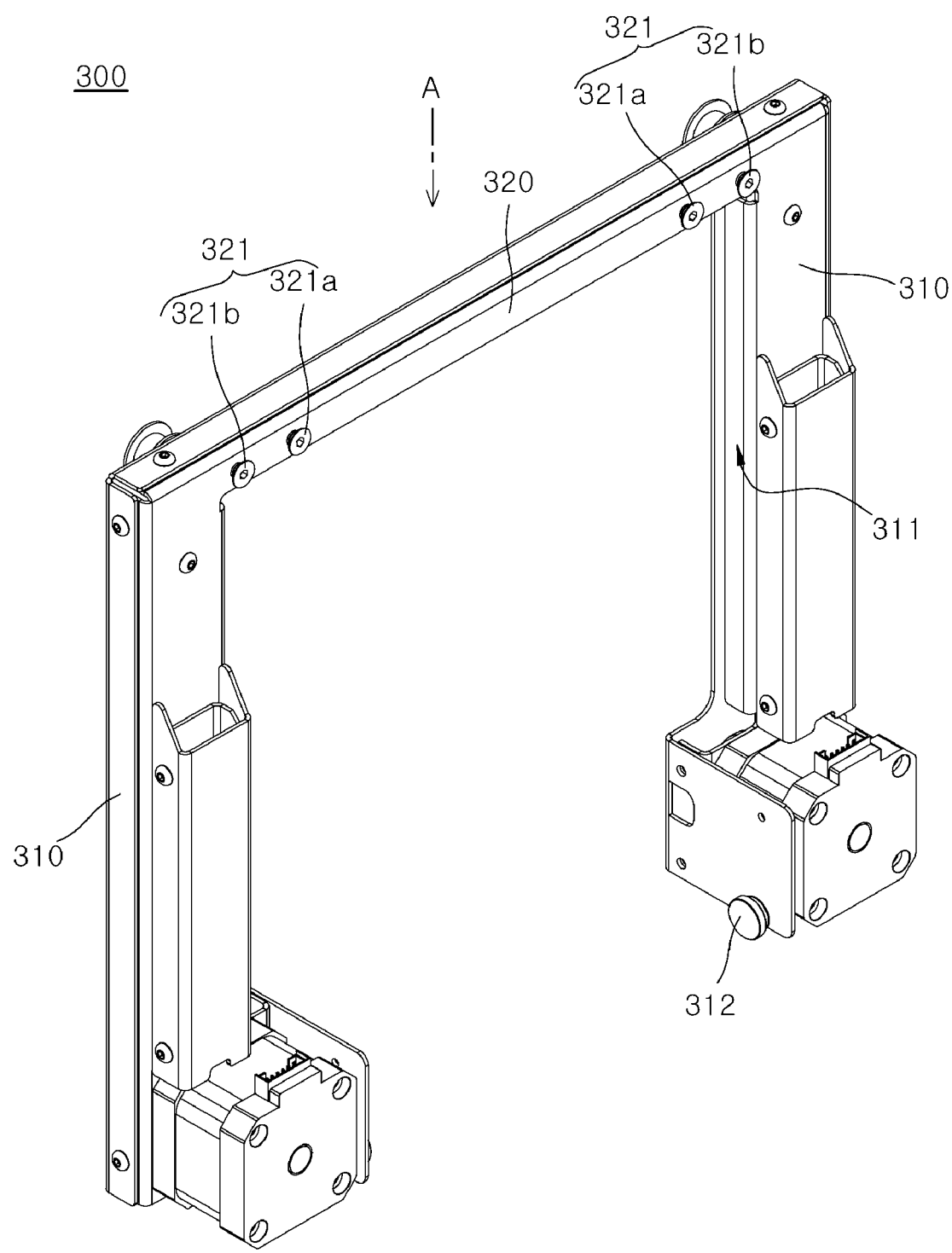
FIG. 8 and FIG. 9 are views of a bridge of the foldable 3D printer according to the present invention.

As described herein, the X-axis direction refers to a longitudinal direction of a main body 100 described below, as shown in FIG. 1, the Y-axis direction refers to a longitudinal direction of a nozzle transfer bar 400 described below, as shown in FIG. 1, and the Z-axis direction refers to a longitudinal direction of a swing bar 310 when a bridge assembly described below is positioned perpendicular to the main body 100, as shown in FIG. 1 and FIG. 8.

Now, a foldable 3D printer according to the present invention will be described with reference to FIG. 1 to FIG. 11.

Figure 2:
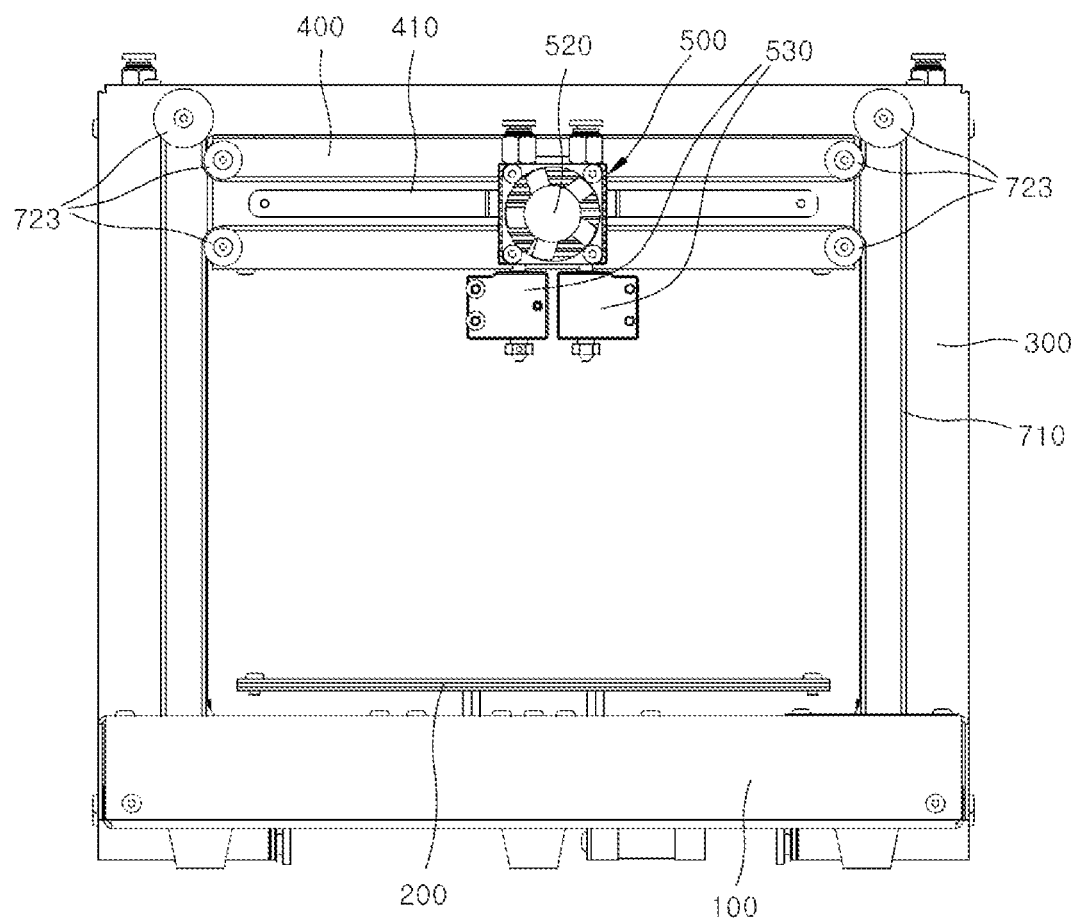
Figure 3:
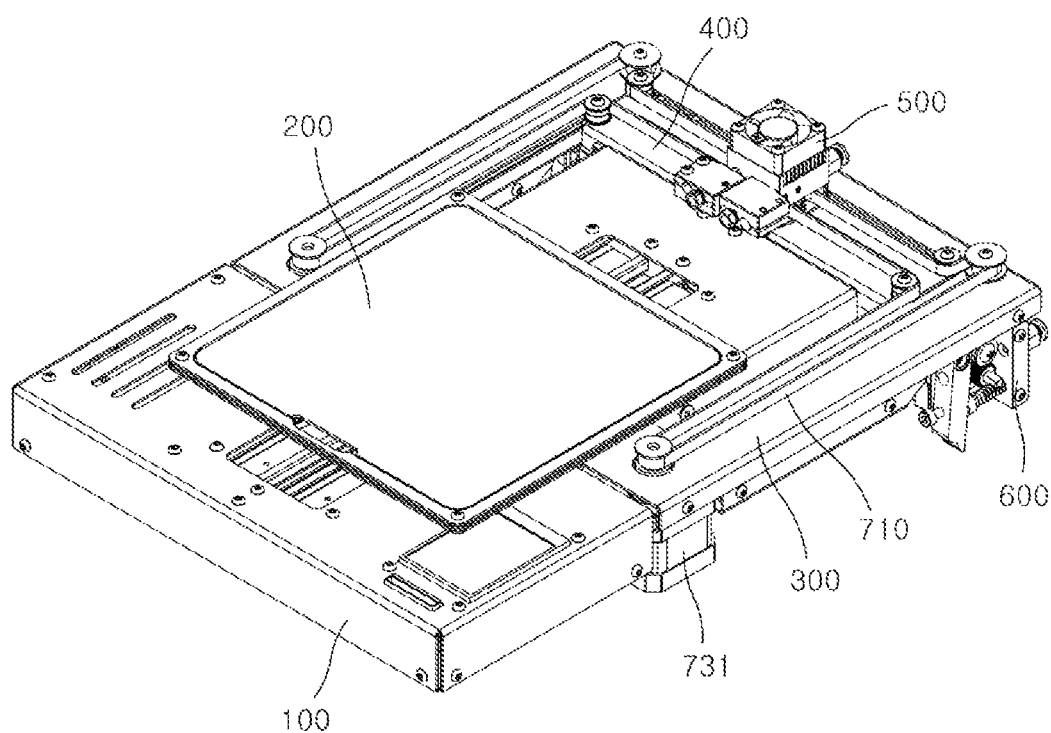

FIG. 1 to FIG. 3 are views showing the overall configuration of a foldable 3D printer according to the present invention. Referring to FIGS. 1 to 3, the foldable 3D printer according to the present invention includes a main body 100, a bridge assembly, a nozzle unit 500, an extruder unit 600, a nozzle transfer belt 710, a belt rotating roller, and a roller motor.

Figure 5:
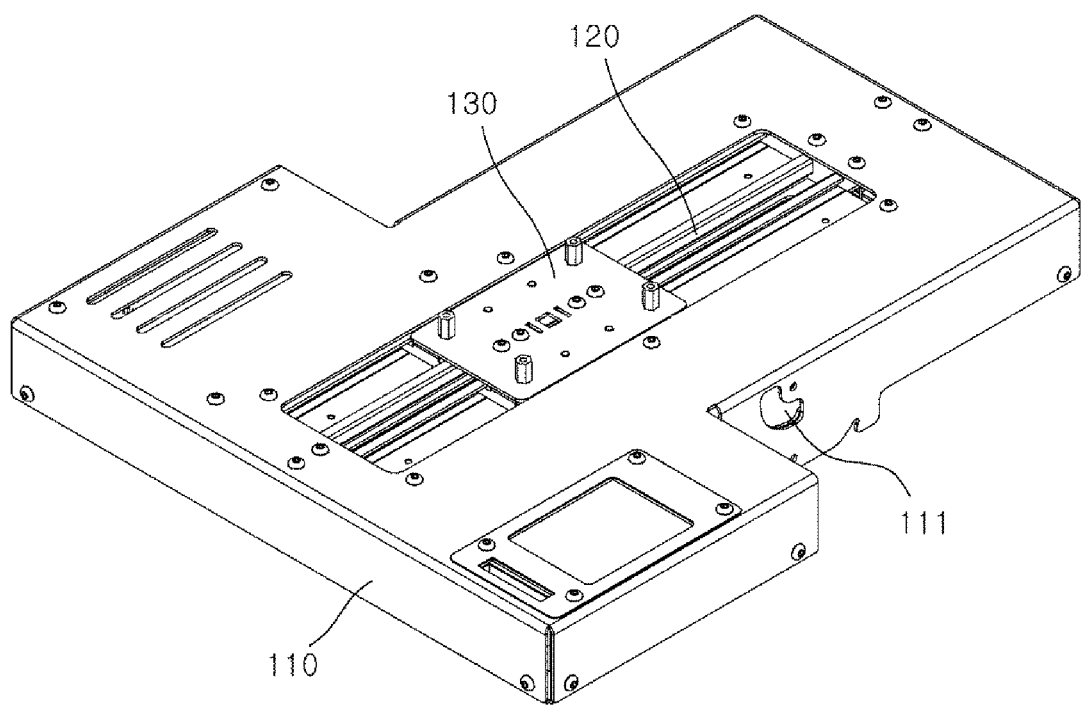
FIG. 5 and FIG. 6 are views of a main body of the foldable 3D printer according to the present invention.
Figure 6:
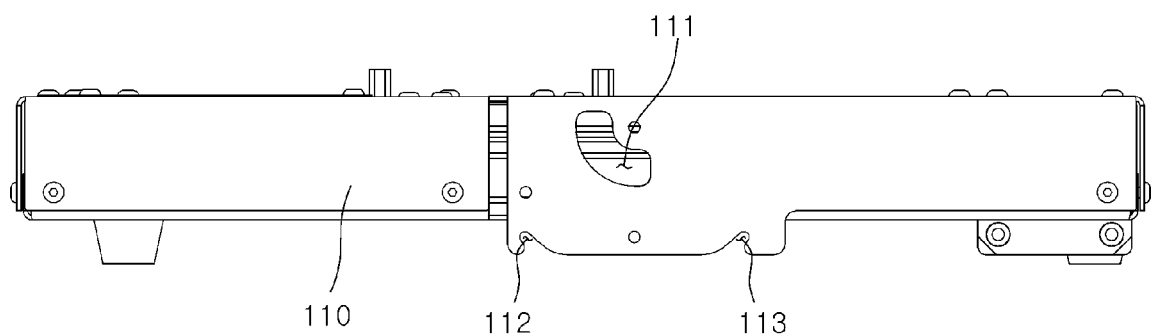

Referring to FIG. 5 to FIG. 6, the main body 100 includes a housing 110, a stage transfer guide 120, and a stage support 130.

The housing 110 is coupled at an upper portion thereof to a stage 200, is coupled at both lateral sides thereof to the bridge assembly, and includes the stage transfer guide 120 embedded therein to transfer the stage 200.

Here, the housing 110 is formed at both lateral sides thereof with a swing bar coupling groove 111 to which the bridge assembly including a bridge 300 and a nozzle transfer bar 400 is coupled such that the bridge 300 can be rotated about the Y-axis.

In addition, a first swing bar securing groove 112 and a second swing bar securing groove 113 are formed below the swing bar coupling groove 111.

That is, when the foldable 3D printer according to the present invention is unfolded to be operated, as shown in FIG. 1, a swing bar securing protrusion 312 described below is inserted into the second swing bar securing groove 113 to secure the bridge 300 to the housing 110, whereby the bridge 300 can maintain a position perpendicular to the housing 110.

In addition, when the foldable 3D printer according to the present invention is not in operation for the purpose of, for example, transport or storage, the swing bar securing protrusion 312 is inserted into the first swing bar securing groove 112 to secure the bridge 300 to the housing 110, whereby the bridge 300 can maintain a position folded parallel to the housing 110.

The stage transfer guide 120 is embedded in the housing 110 in a longitudinal direction of the housing 110 to transfer the stage support 130.

For example, the stage transfer guide 120 may be provided in the form of a rail or may be provided in the form of a screw that is rotatable to transfer the stage support 130 in the X-axis direction.

However, it will be understood that the present invention is not limited thereto and any other method may be employed so long as the stage support 130 can be transferred by the stage transfer guide 120 under the control of a controller.

The stage support 130 has a lower surface connected to the stage transfer guide 120 and an upper surface coupled to the stage 200, whereby the stage 200 can be moved in the X-axis direction as the stage support 130 is moved.

Figure 7:
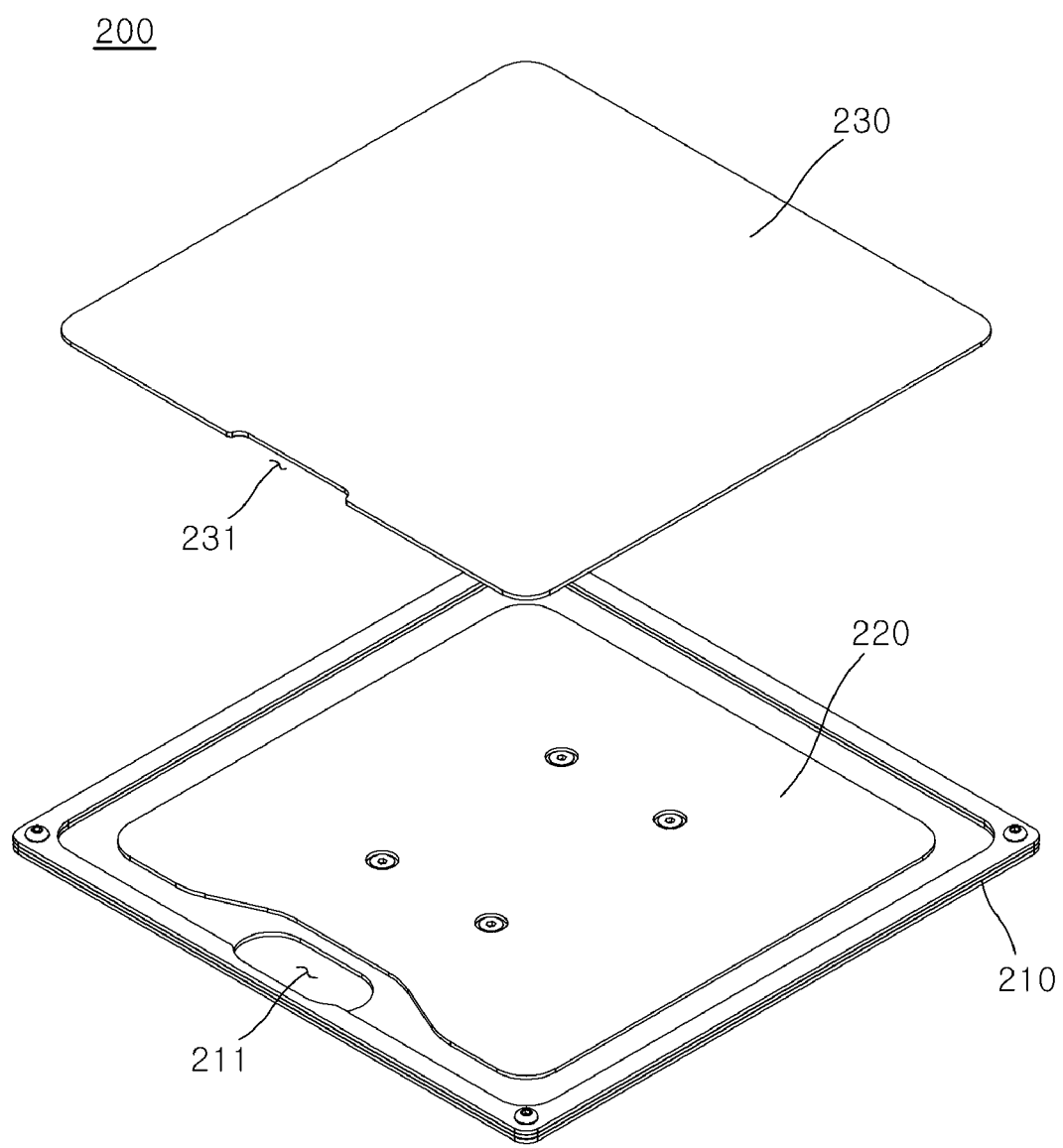
FIG. 7 is a view of a stage of the foldable 3D printer according to the present invention.

FIG. 7 is a view of the stage 200 of the foldable 3D printer according to the present invention. The stage 200 is coupled to the stage support 130 and is moved in the X-axis direction. Specifically, the stage 200 includes a platform 210, a platform magnet 220, and a stacking portion 230.

The platform 210 is coupled to the upper surface of the stage support 130 and is moved in the Y-axis direction as the stage support 130 is moved.

Here, the platform 210 is formed with an attachment/detachment hole to facilitate attachment/detachment of the stacking portion 230 described below to/from the platform 210.

In addition, the platform 210 is formed at the center thereof with a stacking portion insertion groove (not designated by reference numeral) into which the stacking portion 230 described below is inserted, whereby the stacking portion 230 can be prevented from being pushed away from the platform 210 in the X-axis or Y-axis direction upon moving the stacking portion 230 with the platform 210 coupled thereto or upon stacking a molding material on the stacking portion 230.

The platform magnet 220 is coupled to the upper portion of the platform 210 and may be disposed at the center of the platform 210, as shown in FIG. 7. Alternatively, the platform magnet 220 may be provided as multiple platform magnets disposed at corners of the platform 210.

The stacking portion 230 is inserted into the stacking portion insertion groove and is provided in the form of a metal plate to be coupled to the platform 210 by magnetic force of the platform magnet 220.

The stacking portion 230 has an attachment/detachment groove 231 formed in a region thereof corresponding in location to the attachment/detachment hole 211 to facilitate attachment/detachment of the stacking portion 230 to/from the platform 210.

Figure 9:
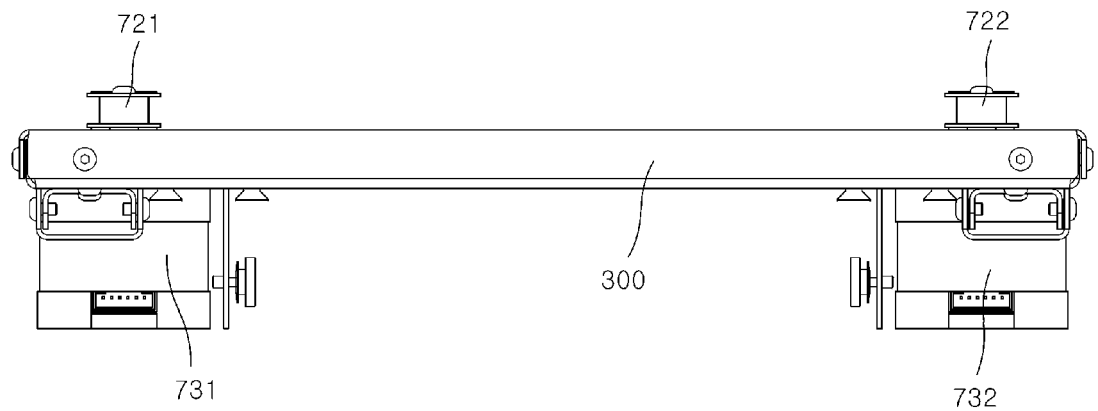

FIG. 8 and FIG. 9 are views of the bridge 300 of the foldable 3D printer according to the present invention. Here, FIG. 9 shows the bridge 300, as viewed in the direction A of FIG. 8. Referring to FIG. 1, FIG. 2, FIG. 8, and FIG. 9, the bridge 300 includes a swing bar 310 and a support bar 320.

The swing bar 310 is provided as a pair of swing bars coupled to opposite lateral sides of the housing 110, and the support bar 320 is connected at opposite ends thereof to respective ends of the swing bars 310, such that the bridge 300 has a U-shape.

Each of the swing bars 310 has a nozzle transfer bar guide 311 formed on a surface thereof facing the other one of the pair of swing bars in a longitudinal direction of the swing bar 310 to transfer the nozzle transfer bar in the Z-axis direction.

Although not shown in the drawings, the nozzle transfer bar 400 and the nozzle transfer bar guide 311 are shaped to mesh with each other. Specifically, both ends of the nozzle transfer bar 400 may have a flat planar shape to be inserted into the nozzle transfer bar guide 311, may have a U-shape to be inserted into and firmly secured to the nozzle transfer bar guide 311, or may have a shape that allows the nozzle transfer bar 400 to be inserted into the nozzle transfer bar guide 311 while allowing a space receiving a bearing to be formed between the nozzle transfer bar 400 and the nozzle transfer bar guide 311.

Here, each of the swing bars 310 has a swing bar coupling protrusion (not shown) formed at the other end of a surface thereof facing the other one of the pair of swing bars to be movably inserted into the swing bar coupling groove 111, whereby the swing bar 310 can be rotated with respect to the housing 110 about the Y-axis while being coupled at the other end thereof to the housing 110.

In addition, each of the swing bars 310 has the swing bar securing protrusion 312 formed at the other end thereof below the swing bar coupling protrusion to be secured to the first swing bar securing groove 112 or the second swing bar securing groove 113. Since the other end of the swing bar 310 has been described in detail relating to the first swing bar securing groove 112 or the second swing bar securing groove 113, description thereof will be omitted.

The support bar 320 is connected at opposite ends thereof to respective ends of the pair of swing bars 310 to be integrated with the swing bars 310 while securing the ends of the swing bars 310 thereto. In addition, the support bar 320 has a bracket coupling protrusion 321 formed on the other surface thereof.

The bracket coupling protrusion 321 includes a first protrusion 321a and a second protrusion 321b and is coupled to an extruder bracket 630 described below. When the extruder unit 600 is provided as two extruder units, as shown in FIG. 1, the bracket coupling protrusion 321 is disposed at both ends of the other surface of the support bar 320. Details thereof will be described further below.

That is, when the molding material is sprayed from the nozzle unit 500, the bridge assembly is rotated to be held in a position perpendicular to the main body 100, as shown in FIG. 1 and FIG. 2. In addition, when the foldable 3D printer is not in use, the bridge assembly is folded to a position parallel to the main body 500 and at least part of the main body 500 is inserted into the insertion space defined by the U-shape of the bridge assembly, that is, a space between the pair of swing bars 310, whereby the bridge assembly and the main body 100 form a cuboidal shape, as shown in FIG. 3.

As used herein, the expression "the main body 100 and the bridge assembly are positioned parallel to each other when the 3D printer is not in use" may include any case where the main body 100 and the bridge assembly can be positioned parallel to each other, including a case where the bridge assembly is coupled to the main body to partially protrude from the main body 100 in a perpendicular direction with respect to the ground so as to be laid parallel over the main body 100, as well as a case where the bridge assembly is placed in the same plane as the main body, as shown in FIG. 3.

Here, upon folding the bridge 300, as shown FIG. 3, it is desirable that the nozzle transfer bar 400 described below be moved to a position contacting the support bar 320 prior to folding the bridge 300 to a position parallel to the main body 100.

As used herein, the expression "the bridge assembly has a U-shape" means that the bridge assembly may have any shape that allows the main body to be received in the insertion space defined by the shape of the bridge assembly when the bridge assembly is positioned parallel to the main body 100, including a semicircular shape or a semi-elliptical shape as well as the U-shape as shown in FIG. 1 to FIG. 3 and FIG. 8.

Figure 4:
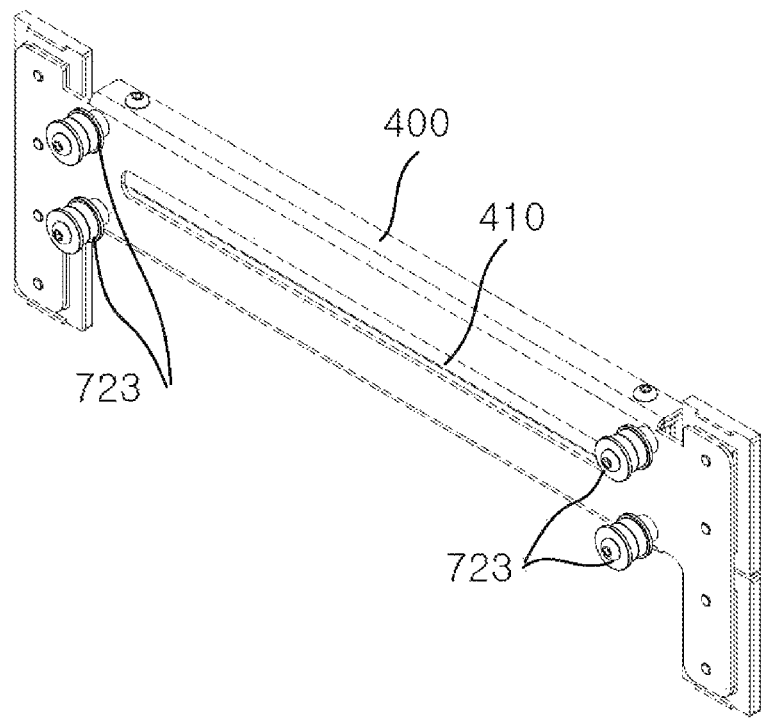
FIG. 4 is a view of the nozzle transfer bar of the foldable 3D printer according to the present invention.

FIG. 4 is a view of the nozzle transfer bar of the foldable 3D printer according to the present invention. The nozzle transfer bar 400 is coupled to the nozzle transfer bar guide 311 to be transferred in the Z-axis direction to transfer the nozzle unit 530 in the Z-axis direction. The nozzle transfer bar 400 has a nozzle coupling groove 410 formed in a longitudinal direction of the nozzle transfer bar 400.

Figure 10:
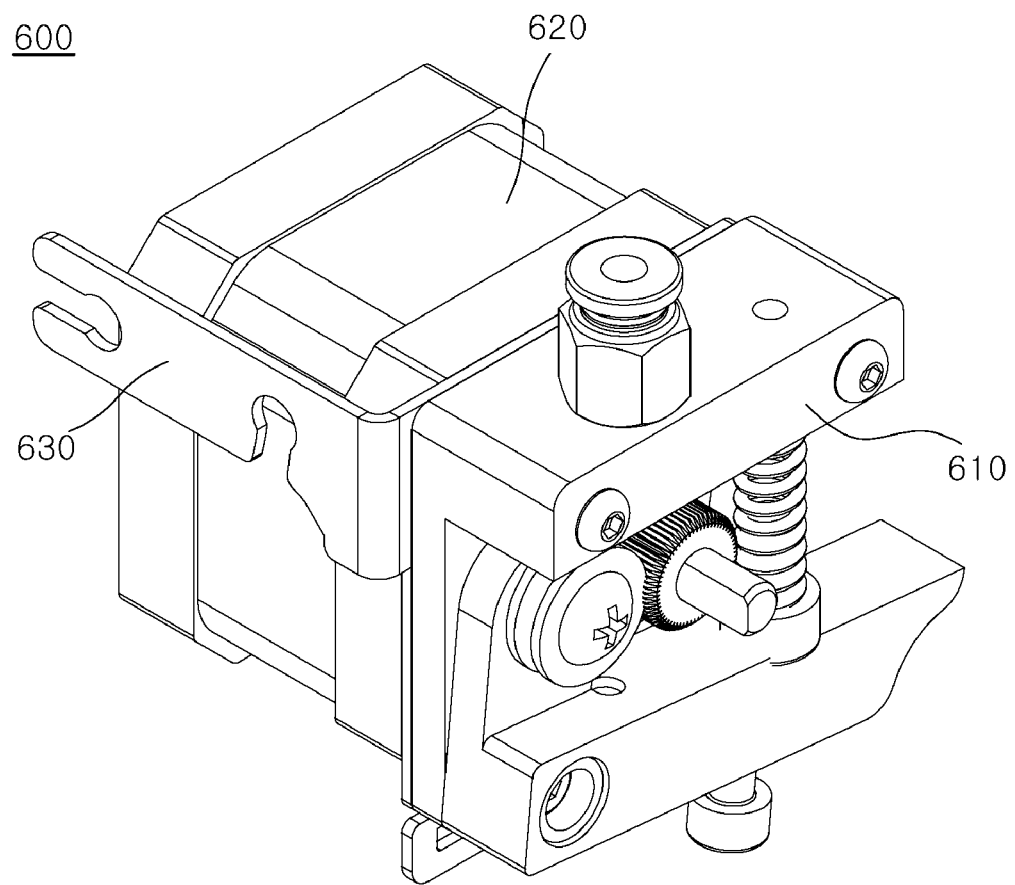
FIG. 10 and FIG. 11 are views of an extruder unit of the foldable 3D printer according to the present invention.
Figure 11:
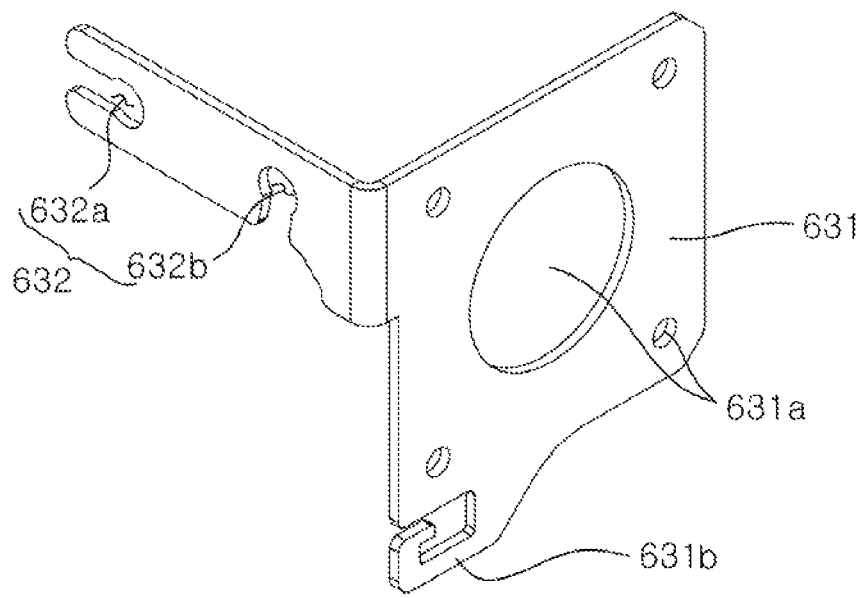
Figure 12:
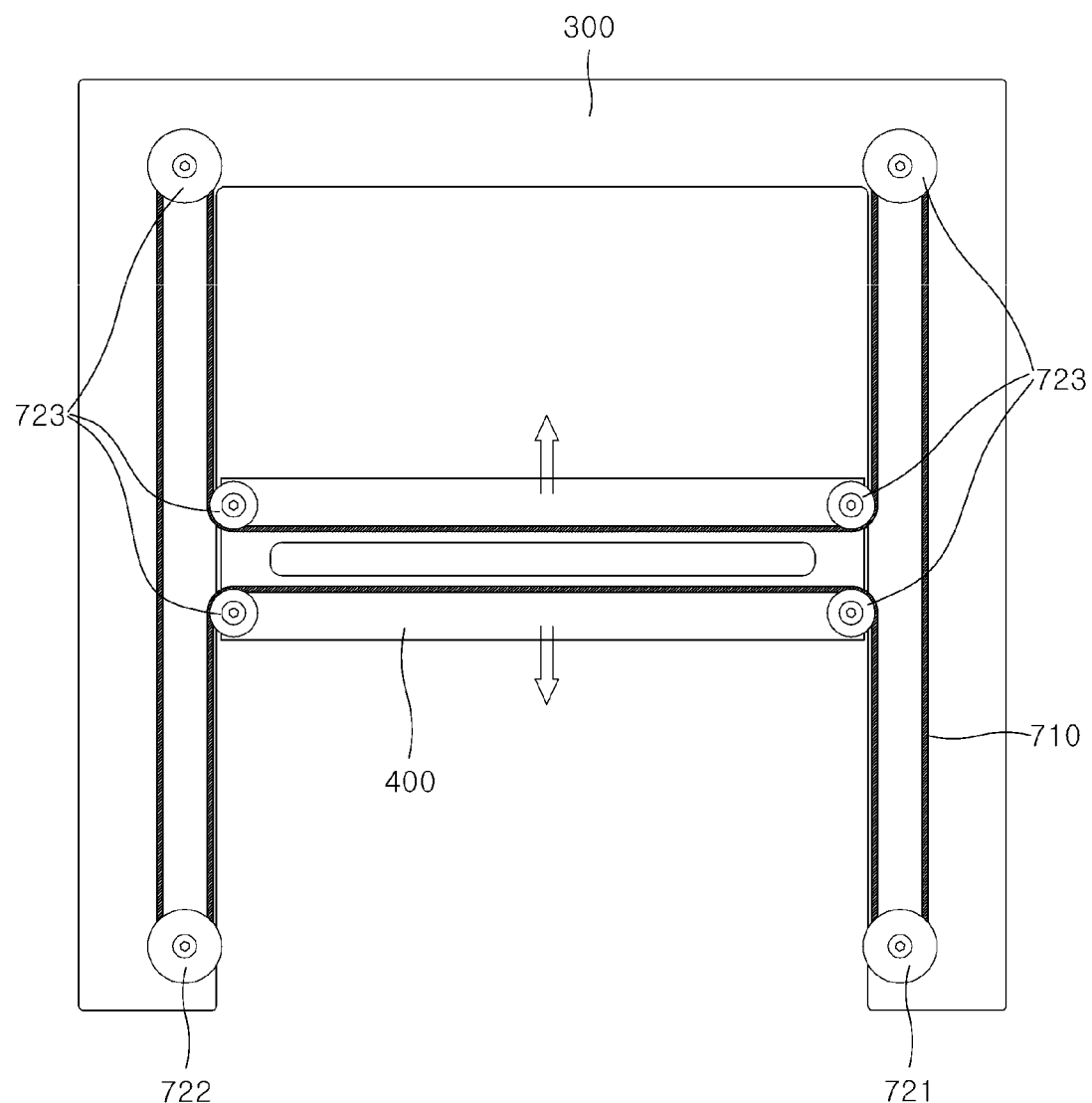
FIG. 12 is a view of a nozzle transfer belt of the foldable 3D printer according to the present invention.

FIG. 10 and FIG. 11 are views of the extruder unit 600 of the foldable 3D printer according to the present invention. The extruder unit 600 is coupled to one end of the swing bar 310 to supply the molding material to the nozzle unit 530. Specifically, the extruder unit 600 includes an extruder 610, an extruder motor 620, and an extruder bracket 630.

The extruder 610 supplies the molding material to the nozzle unit 500, and the extruder motor 620 is coupled to the extruder 610 to drive the extruder 610 such that the extruder pushes the molding material to the nozzle unit 500.

The extruder bracket 630 has an L-shape such that at least part thereof is interposed between the extruder 610 and the extruder motor 620 and the other portion thereof is fitted to the bridge 300.

Specifically, the extruder bracket 630 includes an intervening portion 631 and a fitting engagement portion 632.

The intervening portion 631 is interposed between the extruder 610 and the extruder motor 620. In addition, the intervening portion 631 has: a through-hole 631a through which a separate coupling member coupling the extruder 610 to the extruder motor 620 passes; and an electric wire arrangement portion protruding from a lower portion thereof to arrange electric wires thereon.

The fitting engagement portion 632 protrudes from one side surface of the intervening portion 631 in a perpendicular direction with respect to the intervening portion 631. The fitting engagement portion 632 is formed with a first fitting groove 631a fitted to the first protrusion 321a and a second fitting groove 631b fitted to the second protrusion 321b.

That is, the first protrusion 321a is inserted into the first fitting groove 631a first, and then the second protrusion 321b is inserted into the second fitting groove 631b as the extruder bracket 630 is rotated.

With this configuration in which the extruder bracket 630 is coupled to the bridge 300 by fitting engagement, attachment/detachment of the extruder unit 600 to/from the bridge 300 can be achieved without a separate coupling member. In addition, the first fitting groove 631a and the second fitting groove 631b are open in different directions, whereby the extruder bracket 630 can be prevented from being separated from the bridge 300 due to micro-vibration.

The nozzle unit 500 is coupled to the nozzle transfer bar 400 and is moved in the Y-axis direction to spray the molding material to the stage 200, as shown in FIG. 1 and FIG. 2.

Specifically, the nozzle unit 500 includes a nozzle coupling bracket 510, a nozzle driving motor 520, and a nozzle 530.

The nozzle coupling bracket 510 is coupled to the nozzle driving motor 520 and the nozzle 530 while being coupled to the nozzle transfer bar 400.

Here, a bearing is disposed between the nozzle transfer bar 400 and the nozzle coupling bracket 510 such that the nozzle coupling bracket can be smoothly transferred in the Y-axis direction with respect to the nozzle transfer bar 400 by the nozzle transfer belt 710 described below.

In addition, the nozzle transfer belt 710 described below passes through the nozzle coupling bracket 510. When the nozzle transfer belt 710, which is looped in two strands to form a closed circuit, as shown in FIG. 1, passes through the nozzle coupling bracket 510, the nozzle coupling bracket 510 is coupled only to one strand of the nozzle transfer belt 710.

The nozzle driving motor drives the nozzle 530 such that the molding material supplied from the extruder 610 to the nozzle 530 is sprayed from the nozzle 530 to the stage 200.

The nozzle 530 sprays the molding material supplied from the extruder 610 onto the stage 200. Here, when the extruder 610 is provided as two extruders, as described above, the nozzle 530 is preferably provided as two nozzles.

That is, the nozzles 530 may receive molding materials from the respective extruders 610 and spray the molding materials. Here, the molding materials sprayed from the respective nozzles 530 may be different from each other. In addition, only one of the nozzles 530 may be selectively operated.

However, it will be understood that the present invention is not limited thereto and the number of extruders 610 and the number of nozzles 530 may be varied depending on the number of molding materials needed for 3D printing of a target object.

The nozzle transfer belt 710 is coupled to the nozzle 530 to transfer the nozzle 530. The belt rotating roller is coupled to one surface of the bridge 300 and the nozzle transfer bar 400 to transmit power to the nozzle transfer belt 710 to rotate the nozzle transfer belt 710. The roller motor is coupled to the other surface of the bridge 300 to drive the belt rotating roller.

That is, the roller motor includes a first roller motor 731 and a second roller motor 732 coupled to the respective swing bars 310, as shown in FIG. 1, FIG. 2, FIG. 9, and FIG. 12.

In addition, the belt rotating roller includes a first power transmission roller 721 to a third power transmission roller 723. The first power transmission roller 721 is coupled to the first roller motor 731 to be rotated by power transmitted from the first roller motor 731. The second power transmission roller 722 is coupled to the second roller motor 732 to be rotated by power transmitted from the second roller motor 732 to move the nozzle unit 500 in the Z-axis and Y-axis directions. The third power transmission roller 723 is coupled to the bridge 300 and the nozzle transfer bar 400 to support the nozzle transfer belt 710 rotated by power transmitted from the first power transmission roller 721 and the second power transmission roller 722 such that the nozzle transfer belt 710 remains tensioned. Preferably, the third power transmission roller 723 is rotated by the nozzle transfer belt 710.

Here, surfaces of the first power transmission roller 721 to the third power transmission roller 723 abutting the nozzle transfer belt 710 are preferably saw-toothed to reduce loss of transmitted power.

Although the present invention has been described with reference to some embodiments in conjunction with the accompanying drawings, it should be understood that the foregoing embodiments are provided for illustration only and are not to be in any way construed as limiting the present invention, and that various modifications, changes, alterations, and equivalent embodiments can be made by those skilled in the art without departing from the spirit and scope of the invention.

LIST OF REFERENCE NUMERALS

100: Main body
110: Housing
111: Swing bar coupling groove
112: First swing bar securing groove
113: Second swing bar securing groove
120: Stage transfer guide
130: Stage support
200: Stage
210: Platform
211: Attachment/detachment hole
220: Platform magnet
230: Stacking portion
231: Attachment/detachment groove
300: Bridge
310: Swing bar
311: Nozzle transfer bar guide
312: Swing bar securing protrusion
320: Support bar
321: Bracket coupling protrusion
321a: First protrusion
321b: Second protrusion
400: Nozzle transfer bar
410: Nozzle coupling groove
500: Nozzle unit
510: Nozzle coupling bracket
520: Nozzle driving motor
530: Nozzle
600: Extruder unit
610: Extruder
620: Extruder motor
630: Extruder bracket
631: Intervening portion
631a: Through-hole
631b: Electric wire arrangement portion
632: Fitting engagement portion 632a: First fitting groove
632b: Second fitting groove
710: Nozzle transfer belt
721: First power transmission roller
722: Second power transmission roller
723: Third power transmission roller
731: First roller motor
732: Second roller motor

What is claimed is:

1. A foldable 3D printer comprising:
a main body having an upper surface parallel to the ground;
a stage coupled to the upper surface of the main body and adapted to receive a molding material;
a nozzle unit capable of spraying the molding material onto the stage;
a bridge assembly adapted to mount the nozzle unit and comprising two ends facing the main body, the bridge assembly being rotatably coupled to the main body, wherein the bridge assembly is capable of being positioned parallel to the upper surface and is capable of being positioned perpendicular to the upper surface;
wherein the main body comprises two lateral sides;
wherein each of the lateral sides face the bridge assembly;
wherein each lateral side comprises a swing bar coupling groove;
wherein each of the ends of the bridge assembly is capable of being rotatably coupled to one of the swing bar coupling grooves, respectively;
wherein each lateral side of the main body further comprises first and second swing bar securing grooves formed below the swing bar coupling groove, respectively;
wherein each of the ends of the bridge assembly comprises a swing bar securing protrusion facing the main body and formed at a side of the end, respectively;
wherein each of the swing bar securing protrusions is capable of being respectively detachably coupled to one of the first swing bar securing grooves and/or one of the second swing bar securing grooves;
wherein, when the bridge assembly is positioned parallel to the upper surface, each swing bar securing protrusion is fitted into the one of the first swing bar securing grooves, respectively; and
wherein, when the bridge assembly is positioned perpendicular to the upper surface, each swing bar securing protrusion is fitted into one of the second swing bar securing grooves, respectively.

2. The foldable 3D printer according to claim 1, further comprising:
wherein the bridge assembly has a U-shape within a plane; and
wherein the plane of the U-shaped bridge assembly is capable of being placed parallel to the upper surface of the main body when the foldable 3D printer is not in use.

3. The foldable 3D printer according to claim 2, wherein the bridge assembly further comprises:
a bridge having the U-shape; and
a nozzle transfer bar coupled to the bridge and configured to guide movement of the nozzle unit in a Y-axis direction.

4. The foldable 3D printer according to claim 3, wherein the bridge comprises two nozzle transfer bar guides, wherein the nozzle transfer bar guides guide movement of the nozzle transfer bar in a Z-axis direction.

5. The foldable 3D printer according to claim 4, further comprising:
wherein the bridge comprises a pair of swing bars and a support bar connected the swing bars, wherein each of the swing bars comprise one of the swing bar securing protrusions, respectively, such that the swing bars and support bar are capable of being rotated with respect to the main body;
wherein one of the nozzle transfer bar guides is respectively formed on each of the swing bars; and
wherein the nozzle transfer bar is coupled to the nozzle transfer bar guides to be movable in the Z-axis direction.

6. The foldable 3D printer according to claim 1, further comprising:
an extruder unit coupled to the bridge assembly and configured to supply the molding material to the nozzle unit; and
wherein the extruder unit is detachably coupled to the bridge assembly.

7. The foldable 3D printer according to claim 6, wherein the extruder unit comprises:
an extruder supplying the molding material to the nozzle unit;
an extruder motor coupled to the extruder to drive the extruder such that the extruder pushes the molding material to the nozzle unit; and
an extruder bracket having an L-shape to be partially interposed between the extruder and the extruder motor; and
wherein the extruder bracket capable of being be fitted the bridge assembly.

8. The foldable 3D printer according to claim 7, further comprising:
wherein the bridge assembly comprises a bridge having a U-shape and comprising a pair of swing bars and a support bar connected to respective ends of the swing bars to form the U-shape;
wherein the support bar comprises two ends and a bracket coupling protrusion formed at both ends of the support bar, the bracket coupling protrusions are configured to fit the extruder bracket the support bar;
wherein each bracket coupling protrusion comprises a first protrusion and a second protrusion; and
wherein the extruder bracket comprises an intervening portion interposed between the extruder and the extruder motor, and a fitting engagement portion protruding from one surface of the intervening portion in a perpendicular direction with respect to the intervening portion, the fitting engagement portion having a first fitting groove fitted to the first protrusion and a second fitting groove fitted to the second protrusion.

9. The foldable 3D printer according to claim 1, wherein the main body comprises:
a housing to which the bridge assembly is coupled;
a stage transfer guide embedded in the housing in a longitudinal direction of the housing to transfer the stage in an X-axis direction; and
a stage support coupled to the stage transfer guide to be transferred in the X-axis direction and having an upper surface coupled to the stage.

10. The foldable 3D printer according to claim 1, wherein the stage comprises:
a platform having a platform magnet;
a stacking portion detachably coupled to the platform by magnetic force of the platform magnet; and the platform being comprising a hole to facilitate attachment and/or detachment of the stacking portion.

11. The foldable 3D printer according to claim 1, further comprising:
   a nozzle transfer belt coupled to the nozzle unit to transfer the nozzle unit;
   multiple belt rotating rollers coupled to one surface of the bridge assembly to transmit power to the nozzle transfer belt to rotate the nozzle transfer belt; and
   multiple roller motors coupled to another surface of the bridge assembly to drive the belt rotating rollers, respectively.

* * * * *